United States Patent [19]

Jones

[11] 4,271,615
[45] Jun. 9, 1981

[54] LOCKING DEVICE FOR EXCAVATING EQUIPMENT
[75] Inventor: Larren F. Jones, Beaverton, Oreg.
[73] Assignee: ESCO Corporation, Portland, Oreg.
[21] Appl. No.: 115,135
[22] Filed: Jan. 24, 1980
[51] Int. Cl.$^3$ .............................................. E02F 9/28
[52] U.S. Cl. ............................ 37/142 A; 299/92; 403/408; 403/409; 403/318; 411/511
[58] Field of Search ............ 37/142 R, 142 A, 141 R, 37/141 T; 299/92; 85/8.3; 403/291, 372, 221, 408, 409, 374, 379, 318

[56] References Cited

U.S. PATENT DOCUMENTS

| | | | |
|---|---|---|---|
| 2,870,667 | 1/1959 | Murtaugh | 37/142 A |
| 2,919,506 | 1/1960 | Larsen | 37/142 A |
| 3,126,654 | 3/1964 | Eyolfson et al. | 37/142 A |
| 3,572,785 | 3/1971 | Larson | 37/142 A |
| 3,722,932 | 3/1973 | Dougall | 37/142 A X |
| 4,192,089 | 3/1980 | Schwappach | 37/142 A |

FOREIGN PATENT DOCUMENTS

| | | | |
|---|---|---|---|
| 2353848 | 10/1973 | Fed. Rep. of Germany | 37/142 A |
| 2238454 | 2/1974 | Fed. Rep. of Germany | 37/142 A |
| 2713227 | 10/1978 | Fed. Rep. of Germany | 37/142 A |

*Primary Examiner*—E. H. Eickholt
*Attorney, Agent, or Firm*—Tilton, Fallon, Lungmus & Chestnut

[57] ABSTRACT

A locking device for excavating equipment including a C-clamp member and a wedge member, the wedge member having ratchet-type teeth held in position against the C-clamp member by means of an arcuate lock which itself is resiliently mounted within the C-clamp member.

11 Claims, 6 Drawing Figures

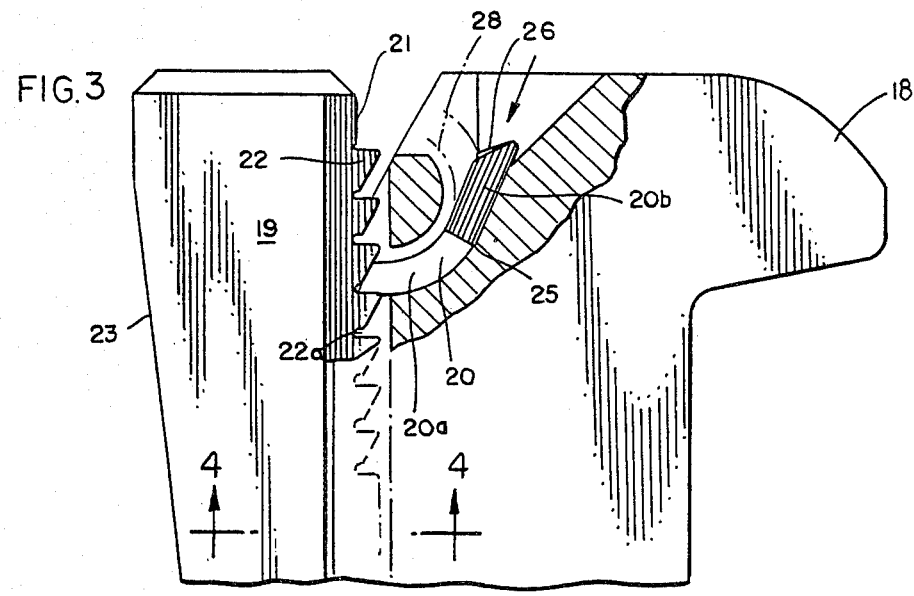
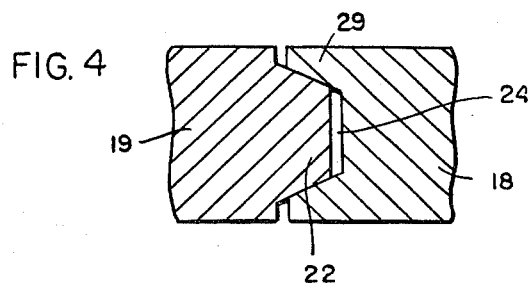
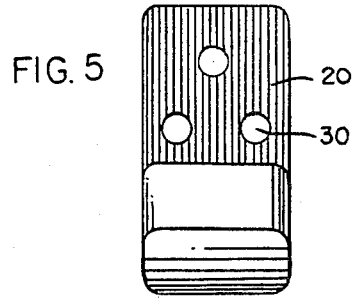
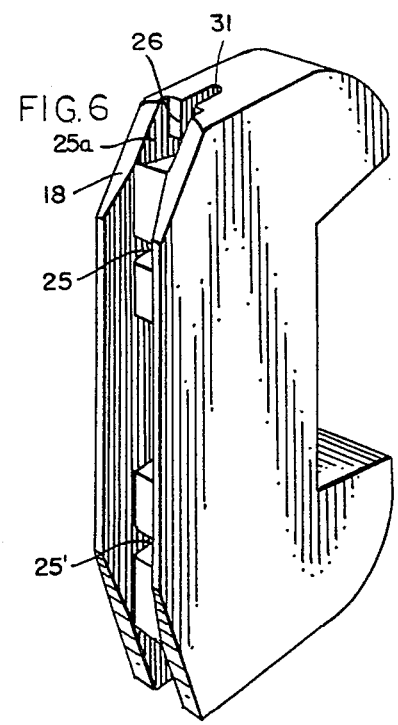

LOCKING DEVICE FOR EXCAVATING EQUIPMENT

BACKGROUND AND SUMMARY OF INVENTION

This invention relates to a locking device for excavating equipment and, more particularly, to a device including a C-shaped clamp member and a wedge member useful in securing an adapter to the lip of a shovel dipper bucket, etc.

This invention is related to the co-pending application of Frederick C. Hahn and Larren F. Jones, Ser. No. 112,160, filed Jan. 16, 1980 to which reference may be made for additional details of construction not specified here.

For years, workers in the excavating tooth fastening art have been entrigued by the idea of using corrugated pins and locks to develop greater holding power in the lock. In this connection, reference may be made to co-owned U.S. Pat. Nos. 3,126,654 and 4,061,432. In some instances, the art workers have gone to a ratchet type of corrugation—see U.S. Pat. No. 3,722,932—because of the ease of installation but the greater resistance to inadvertent disassembly. However, conventional ratchets as seen in the '932 patent are unsatisfactory because when it does comes time to disassemble, this is very difficult.

The mutually exclusive problems of good, strong holding power during operation yet easy disassembly when desired have been reconciled according to the instant invention which makes use of a unique lock engaging the ratchet which is partly metal and partly resilient material such as rubber and which is conveniently upsetable when disassembly is indicated.

DETAILED DESCRIPTION

The invention is described in conjunction with an illustrative embodiment in the accompanying drawing, in which FIG. 1 is a fragmentary perspective view of a dipper lip equipped with an adapter and showing the inventive lock in the process of assembly;

FIG. 3 is a fragmentary side elevational view, partially broken away showing the working parts of the inventive lock;

FIG. 4 is an enlarged sectional view taken along the sight line 4—4 of FIG. 3;

FIG. 5 is a front elevational view of the arcuate lock portion of the invention; and FIG. 6 is a fragmentary perspective view of the top portion of the C-clamp showing the locking shoulders which releasably restrain the arcuate lock member in position until disassembly is indicated.

Figure 1:
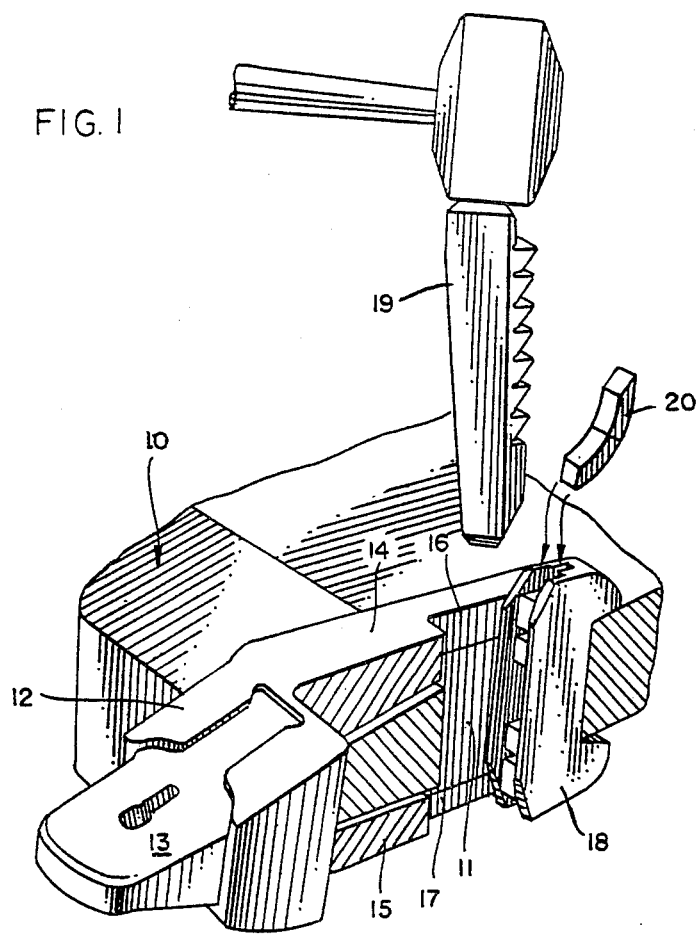

In the illustration given and with reference first to FIG. 1, the numeral 10 designates generally a portion of the lip of an excavating machine such as the shovel dipper, drag line bucket, etc., and which is equipped with a plurality of spaced apart openings slightly rearward of the forward edge of the lip—one of which is indicated at 11. Straddling the lip 11 is an adapter 12 equipped with the usual forwardly projecting nose 13 for the receipt of a point (not shown). For the purpose of straddling the lip 10, the adapter 12 is equipped with rearwardly extending legs 14 and 15 each of which is equipped with a lock receiving opening as at 16 and 17, respectively. In FIG. 1, a C-shaped clamp member 18 shown installed in the aligned openings 16, 11, 17.

Cooperating with the clamp member 18 in locking the adapter 12 in place on the lip 10 is a wedge member 19 and a lock member generally designated 20. The way the members 18-20 are assembled can be appreciated from a consideration of FIG. 3.

In FIG. 3, it is seen that the wedge member 19 is equipped with a rear face 21 on which are provided a plurality of serrations in the form of ratchet teeth 22. The wedge shape is developed by longitudinally tapering the front wall 23 relative to the rear face 21. As can be appreciated from a consideration of FIG. 4, the ratchet teeth 22 are narrower than the wedge 19 and are rearwardly tapered so as to sit within a correspondingly contoured slot 24 in the clamp member 18.

Referring again to FIG. 3, it will be noted that the clamp member 18 adjacent the upper end thereof is equipped with an arcuate passageway 25 in which is received the lock member 20. The lock member 20 has a forward portion as at 20a which is constructed of metal and terminates in a sloping face to develop a contour corresponding to that of the ratchet teeth. The rear portion 20b of the lock member 20 is constructed of resilient material such as rubber and is suitably bonded to the forward portion 20a. The rear portion 20b is seen in a temporary holding position by virtue of shoulders 26 provided within the passageway 25.

Figure 2:
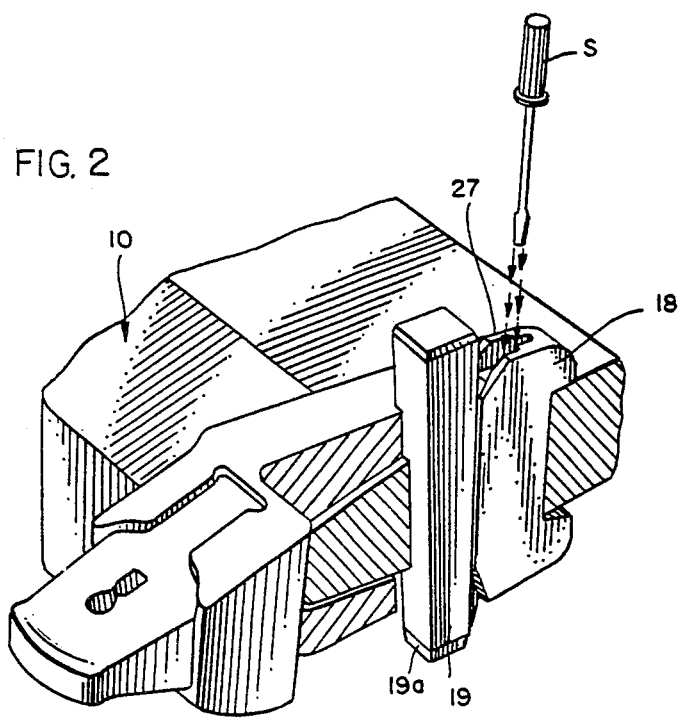
FIG. 2 is a view similar to FIG. 1 but showing the lock installed in place with the lock parts in section to show engagement thereof and in which the lock is in the process of being disassembled.

Referring now to FIG. 2, it will be seen that a screwdriver S is in the process of being inserted within the upper end 27 of the passageway 25 for the purpose of dislodging the resilient portion 20b from its "held" position under the shoulders 26. By bending the resilient portion 20b to the dotted line position designated 28 in FIG. 3, the lock between the lock member 20 and the wedge member 19 is released so that the lock member 20 can move further into the passageway 25 when the wedge member 19 is moved upwardly—as by applying force to the bottom thereof as at 19a by a sledge, hammer, etc.

The C-shaped clamp member 18 is reversible by virtue of being symmetrical about a mid-plane and is equipped with a lower passageway 25' (see FIG. 6) should the member 18 be inserted in reverse fashion from that shown in FIG. 3.

In the operation of the invention, the lock member 20 is normally inserted into the C-shaped clamp member 18 from the front, i.e., into the slot 24 defined between the sidewalls or flutes 29. This insures that the resilient portion 20b will engage the shoulders 26 with minimum of difficulty. This disposes the forward portion 20a between the flutes 29 and serves as a ratchet or pawl for the ratchet teeth 22 of the wedge member 19. Thereafter the wedge member 19 is inserted in the fashion depicted in FIG. 1 with the lock member 20 sliding along the sloping portions of the teeth 22 until the wedge member 19 is fully engaged. During this operation, the resilient portion 20b is alternately compressed and relaxed, the compression being implemented by virtue of bores 30 (see FIG. 5) within the resilient portion 20b. Simultaneous with the foregoing, the flutes 29 not only serve to guide the wedge member 19 but by lateral confinement serve to stabilize the movement into a linear downward movement and thus insure proper engagement of the lock member 20 therewith. The arrangement of the teeth 22 and the flutes 29 (see FIG. 4) in what might be considered a trapezoidal shape makes for an effective lock irrespective of dimensional variations arising out of casting techniques. Further, it is advantageous to undercut the teeth 22 slightly as at 22a (see FIG. 3) which avoids the possibility of build-up of material within the spaces between adjacent teeth and which might impair the seat between the teeth of the lock member 20. Thus, each time the wedge member 19 is to be reinstalled, it can be quickly cleaned of clinging debris by means of a wire brush or like available tool.

When removal of the adapter 12 is indicated, the previously referred to operation depicted in FIG. 2 is performed. The screwdriver S is inserted into the slot 31 (see FIG. 6) developed between the shoulders 26 so as to engage the upper end of the lock member 20 and pivot it to the dotted line position designated 28 wherein the resilient portion 20b now is disposed in the passageway enlargement 25a (see FIG. 6).

After the wedge member 19 has been removed, the lock member 20 is readily pushed back into the locking position shown in FIG. 3. The relaxed configuration of the lock member 20 is that illustrated in solid line in FIG. 3 wherein the resilient portion 20b is defined by essentially flat front and rear surfaces as contrasted to the arcuate front and rear surfaces of the forward metal portion 20a. This also facilitates the insertion of the lock member 20 into the passageway 25 at the time of initial assembly.

While in the foregoing specification a detailed description of an embodiment of the invention has been set down for the purpose of illustration, many variations in the details hereingiven may be made by those skilled in the art without departing from the spirit and scope of the invention.

I claim:

1. A lock for releasably securing a slip over adapter to the lip of an excavating machine wherein the lip and adapter have aligned openings receiving said lock, comprising: a C-shaped clamp member and a wedge member arranged in face-to-face contacting relation when installed in said aligned openings, the confronting face of said wedge member being equipped with serrations, said clamp member being vertically elongated to define an upper end, an arcuate passage in said clamp member connecting said upper end with the contacting face of said clamp member, a resilient, arcuate lock mounted in said passage engaging said serrations and means in said passage for releasably mounting said lock therein.

2. The lock of claim 1 in which said lock has a serration-engaging part constructed of metal and a means-engaging part constructed of resilient material, said parts being bonded together.

3. The lock of claim 2 in which said serrations are ratchet shaped, said serration-engaging part being contoured to fit between said serrations.

4. The lock of claim 1 in which said passage is equipped with an enlargement adjacent said upper end, said enlargement being constructed to provide opposed shoulders in one portion thereof to constitute said releasably mounting means, the remaining portion of said enlargement constituting an alternative space for positioning said lock incident to disassembly of said lock.

5. In combination with an excavating machine lip and a slide over adapter positioned thereon and providing aligned openings for the receipt of a lock, a lock in said openings comprising a C-clamp member presenting a forward, vertically extending surface terminating in horizontal top and bottom surfaces, a wedge member also in said openings, and presenting a rearwardly facing surface confronting said forward surface, said wedge member surface being equipped with horizontal serrations, a generally arcuate passage extending from and through said top surface toward and through said vertically extending surface, said passage adjacent said top surface having a constriction in the rear thereof to provide shoulders, and a lock element in said passage having an upper resilient part and a lower metal part, said lock element when engaging said shoulders also engaging said serrations, said lock element being deformable for disengaging said upper part from said shoulders to disengage said lower part from said serrations and permit disassembly of said members.

6. The structure of claim 5 in which said clamp member vertical surface is equipped with a vertically-extending slot defining opposed sidewalls, said wedge member in the portion adjacent said serrations being received in said slot and stabilized by said sidewalls.

7. The structure of claim 6 in which said sidewalls are angularly related to provide said slot with a trapezoidal shape in horizontal section.

8. A releasable lock for mounting a slip-over tooth adapter on the lip of a dipper or the like wherein the adapter and lip have aligned openings, said lock including elongated C-shaped clamp and wedge members having confronting faces, a series of serrations on the wedge face, said C-shaped clamp member having an arcuate passage therein extending upwardly from the face thereof through one end of said C-shaped clamp member, an arcuate lock element in said passage engageable with said serrations, means in said passage maintaining said element in engagement with said serrations, said element having a resilient portion bearing against said means whereby said portion is deformable and thereafter movable past said means to withdraw said element from locking engagement with said serrations.

9. The structure of claim 8 in which said serrations are ratchet shaped to facilitate insertion of said wedge member into said openings while resisting reverse wedge movement, the engaging end of said element conforming to said ratchet shape and being constructed of metal.

10. The structure of claim 9 in which said means include shoulders in said passage restricting movement of said element and said passage being enlarged adjacent to said shoulders, said resilient portion being deformable out of contact with said shoulders and into the enlarged part of said passage to achieve element movement.

11. The structure of claim 8 in which said C-shaped clamp member is equipped with a second arcuate passage therein extending downwardly from the face thereof through the other end of said said C-shaped clamp member whereby said C-shaped clamp member is reversible.

* * * * *